United States Patent
Ramanathan et al.

(10) Patent No.: US 8,364,761 B2
(45) Date of Patent: Jan. 29, 2013

(54) UPDATING CONVERSATIONS AFTER REDIRECTION

(75) Inventors: Rajesh Ramanathan, Redmond, WA (US); Pradipta Kumar Basu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 642 days.

(21) Appl. No.: 11/769,976

(22) Filed: Jun. 28, 2007

(65) Prior Publication Data
US 2009/0006632 A1    Jan. 1, 2009

(51) Int. Cl.
    *G06F 15/16*     (2006.01)
(52) U.S. Cl. ........ 709/205; 709/228; 709/225; 709/204; 370/395.2; 370/325; 455/436
(58) Field of Classification Search .................. 709/204, 709/228, 225, 205; 455/346; 370/395.2, 370/325
See application file for complete search history.

(56) References Cited

U.S. PATENT DOCUMENTS

| | | | |
|---|---|---|---|
| 6,748,420 B1 * | 6/2004 | Quatrano et al. | 709/205 |
| 7,769,809 B2 | 8/2010 | Samdadiya et al. | |
| 7,813,619 B2 * | 10/2010 | Takeda et al. | 386/248 |
| 2002/0093921 A1 * | 7/2002 | Urs et al. | 370/325 |
| 2005/0266847 A1 * | 12/2005 | Tinnakornsrisuphap et al. | 455/436 |
| 2007/0033249 A1 | 2/2007 | Samdadiya et al. | |
| 2007/0116224 A1 * | 5/2007 | Burke et al. | 379/201.12 |
| 2008/0089344 A1 * | 4/2008 | Jansson et al. | 370/395.2 |
| 2008/0144625 A1 * | 6/2008 | Wu et al. | 370/392 |
| 2009/0327428 A1 | 12/2009 | Ramanathan et al. | |
| 2010/0199320 A1 | 8/2010 | Ramanathan et al. | |
| 2010/0290611 A1 | 11/2010 | Ramanathan et al. | |
| 2010/0296640 A1 | 11/2010 | Ramanathan et al. | |

\* cited by examiner

*Primary Examiner* — Tammy Nguyen

(57) ABSTRACT

The claimed subject matter provides a system and/or a method that facilitates maintaining identification data for a real-time communication. A unified communications component can enable real-time communications by employing a communication session with at least one data communication mode, wherein the communication session can include conversation identification (ID). An invitation from a source to a target can initiate at least one of the communication session or the at least one data communication mode within the communication session. An update component can generate an additional conversation ID for the communication session upon detecting the invitation is forwarded by the target.

20 Claims, 10 Drawing Sheets

UPDATING CONVERSATIONS AFTER REDIRECTION

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

As computing and network technologies have evolved and have become more robust, secure and reliable, more consumers, wholesalers, retailers, entrepreneurs, educational institutions and the like are shifting paradigms and are employing the Internet to perform business rather traditional means. For example, today consumers can access their bank accounts on-line (e.g., via the Internet) and can perform an ever growing number of banking transactions such as balance inquiries, fund transfers, bill payments, and the like. In light of such technological advances and evolution, people in general tend to be more and more concerned about being connected and/or available for various communications such as cell phone calls, text messages, emails, instant messages, land line phone calls, voice mails, real-time communications, etc. With the rapid pace of today's society, being available and/or reachable on a constant basis is fitting for busy lifestyles albeit personal or business.

In general, real-time communications can include communication applications that establish and manage connections, communication sessions, or conversations between computing devices, users, machines, and the like. For instance, an instant messaging service can be utilized between two users on distinct machines, in order to communicate in real-time. Real-time communication services can utilize various mechanisms to establish a communication session such as, for instance, an application-level control protocol that computing devices can utilize to discover one another and manage communication sessions there between (e.g., establish, modify, terminate, etc.). Moreover, such communication sessions and/or conversations can include identification data that can identify session participants, time, length, etc. However, issues can arise with such identification data with the advent of unified communications in that participant identification data is extremely difficult to track and/or maintain.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate generating communication session identifications (e.g., conversation identification, identification related to a communication session, etc.) upon the detection of an invitation being redirected and/or forwarded. An update component can dynamically update a conversation ID based upon the detection of a redirection and/or forwarding of an invitation related to real-time communications. In particular, the update component can generate an additional conversation ID in the event an invitation from a source to a target is forwarding and/or redirected, wherein the invitation is associated with a communication session or a data communication mode within the communication session. Moreover, a unified communications component can be an integrated enterprise communication client which can enable real-time communications (e.g., communication session) utilizing various data communication modes such as, but not limited to, instant messaging, voice over Internet protocol (VoIP), video conferencing, audio, voice, desktop sharing, application sharing, etc. Furthermore, the update component can generate an additional conversation ID based upon detecting an escalation of the communication session to a conference call.

In accordance with an aspect of the subject innovation, an evaluation component can continuously monitor a communication session or a data communication mode within the communication session in order to identify an invitation being forwarded and/or redirected. Based at least in part upon the identified redirection and/or forwarding, an ID component can employ a conversation ID to distinguish such forwarded and/or redirected invitation. By implementing a disparate conversation ID to the communication session that is forwarded and/or redirected, the subject innovation eliminates inaccurate conversation IDs that incorrectly identify participants and/or data related thereto. In other aspects of the claimed subject matter, methods are provided that facilitate evaluating real-time communications in order to maintain communication session identification (e.g., conversation identification, conversation ID, etc.) integrity and/or accuracy.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
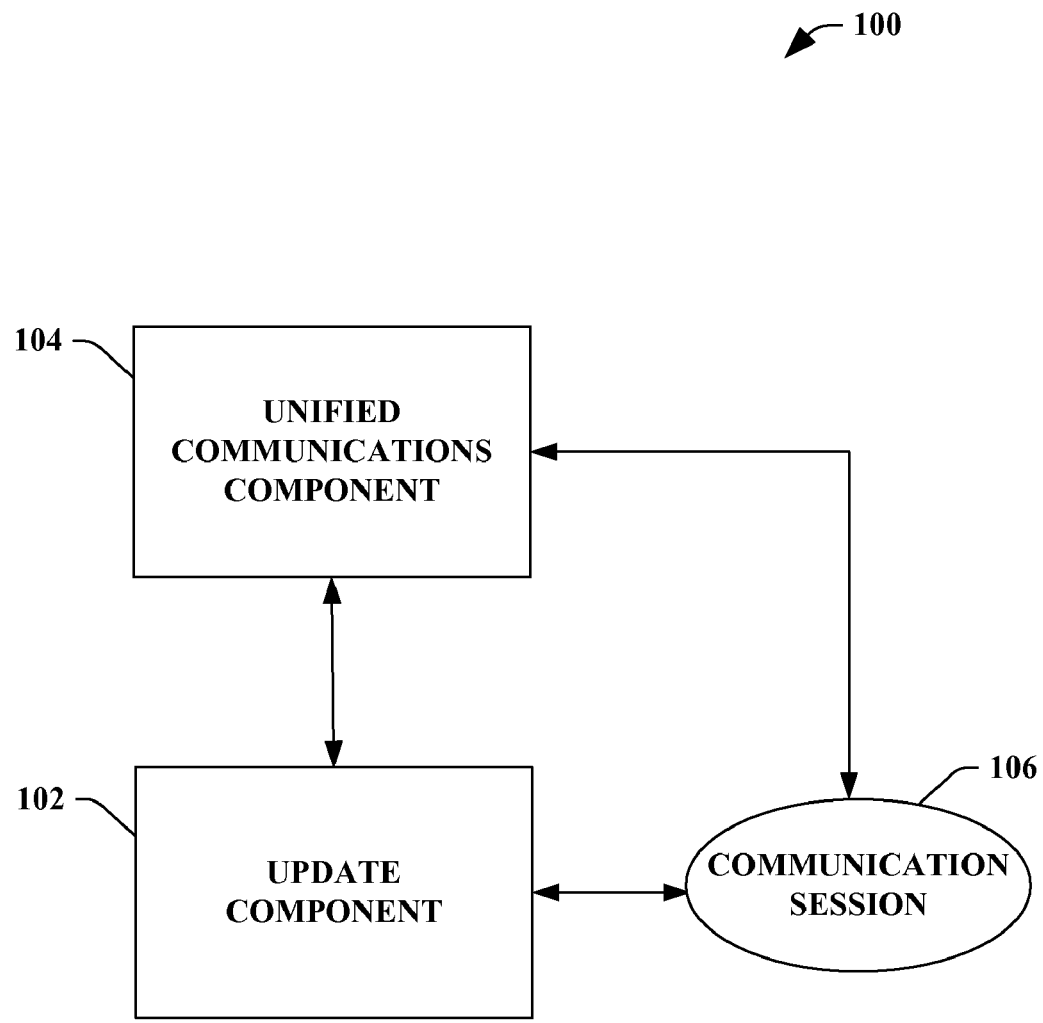
FIG. 1 illustrates a block diagram of an exemplary system that facilitates generating conversation identifications upon the detection of an invitation being redirected and/or forwarded.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates generating conversation identifications upon the detection of an invitation being redirected and/or forwarded. The system 100 can include a unified communications component 104 that can employ at least one communication session 106 identified with a conversation identification (ID), wherein an update component 102 can generate an additional conversation ID upon a redirection of an invitation related to at least one of the communication session 106 or a data communication mode utilized within the communication session 106. In other words, the update component 102 can enable the communication session 106 to be dynamically updated with a conversation ID upon the redirection and/or forwarding of an invitation from a source to a target associated with the communication session 106. By maintaining the conversation ID and/or updating the conversation ID, the system 100 provides enhanced real-time communications in connection with unified communications. It is to be appreciated that the conversation identification can be any suitable identification associated with a communication session and can be related to as a communication session identification, conversation identification, a communication session ID, a conversation ID, etc.

It is to be appreciated that the unified communications component 104 can be an integrated enterprise communication client which can enable real-time communications (e.g., communication session 106) utilizing various data communication modes such as, but not limited to, instant messaging, voice over Internet protocol (VoIP), video conferencing, audio, voice, desktop sharing, application sharing, etc. The unified communications component 104 can leverage a server (not shown) in order to initiate communication sessions 106 utilizing at least one data communication mode. Furthermore, the unified communications component 104 can further enable integration of various computer applications and/or software within the communication session 106 such as, but not limited to, a word processing application, a data spreadsheet application, a presentation/slide creation program, an email application (e.g., leveraging off of address books, contact information, etc.), note taking applications, information gathering applications, multi-user collaboration note taking applications, desktop sharing applications, shared workspace applications, proprietary peer-to-peer software applications, and/or enterprise portal applications. In other words, the unified communications component 104 can employ real-time communications via communication sessions 106 in various data communication modes in which numerous applications and/or software can be leveraged in order to enhance the real-time communication experience.

It is to be further appreciated that a communication session 106 with a data communication mode can be initiated and additional data communication modes can be added with an invitation from a participant of the communication session 106. Thus, a communication session 106 can be between user A and user B with an audio data communication mode and further add a data communication mode such as video to the communication session 106. In such example, the audio data communication mode can be within a first window while the video data communication mode can be within a second window, wherein the windows can have a conversation ID signifying the participants, time, data communication modes, etc. If however, an invitation for a data communication mode from a participant within the communication session is forwarded and/or redirected, the conversation ID is updated to reflect the additional participant(s) (e.g., the entity receiving the forwarded and/or redirected invitation).

For instance, a real-time communication session can be initiated with a unified communication component 104 based upon an invitation from a source to a target. The communication session can include numerous data communication modes and/or techniques between at least one source and at least one target (e.g., based upon the invitation, pre-defined settings, etc.) such as, but not limited to, email, instant messaging, voice, audio, video, voice over Internet Protocol (VoIP), application sharing, real-time communication, and/or any suitable real-time data communication mode associated with unified communications. The communication session between the source and the target can be distinguished by a conversation ID, wherein a disparate conversation ID can be generated for the communication session upon any redirection and/or forwarding of an invitation related to at least one of the communication session 106 or the data communication mode.

For example, a communication session can be initiated by an invitation from a first user to a second user. This communication session can include numerous data communication modes (e.g., email, voice, audio, VoIP, instant messaging, etc.), wherein each mode within the communication session can be initiated by an invitation. Thus, the first user can initiate the communication session with an invitation for instant messaging with the second user. Once the communication session is initiated, numerous data communication modes can be established with invitations from either communication session participant. Thus, the second user can send an invitation for audio to the first user (e.g., in addition to the instant messaging data communication mode). This entire real-time communication with unified communications can be distinguished with a conversation ID. However, if the invitation is redirected and/or forwarded by a target within the communication session 106, the conversation ID can be dynamically updated in order to accurately track data associated therewith.

In another example, the update component 102 can update the conversation ID upon detection of at least one of the communication session 106 or the data communication mode escalating to a conference call. For instance, a communication session can be initiated by an invitation, wherein the data communication mode can be video. However, if the update component 102 identifies such communication session becoming a conference call, the conversation ID can be updated in order to distinguish such communication session. Thus, if the initial communication session escalates (e.g., based on additional invitations, participants included, participants designation of conference call, participants ranking within the corporate hierarchy, a conference call request, a conference call response, a conference call flag/identifier, or a manual designation of a conference call. etc.), the conversation ID can be dynamically updated.

In addition, the system 100 can include any suitable and/or necessary interface component (not shown), which provides various adapters, connectors, channels, communication paths, etc. to integrate the update component 102 into virtually any operating and/or database system(s) and/or with one another. In addition, the interface component can provide various adapters, connectors, channels, communication paths, etc., that provide for interaction with the update component 102, unified communication component 104, communication session 106, and any other device and/or component associated with the system 100.

Figure 2:
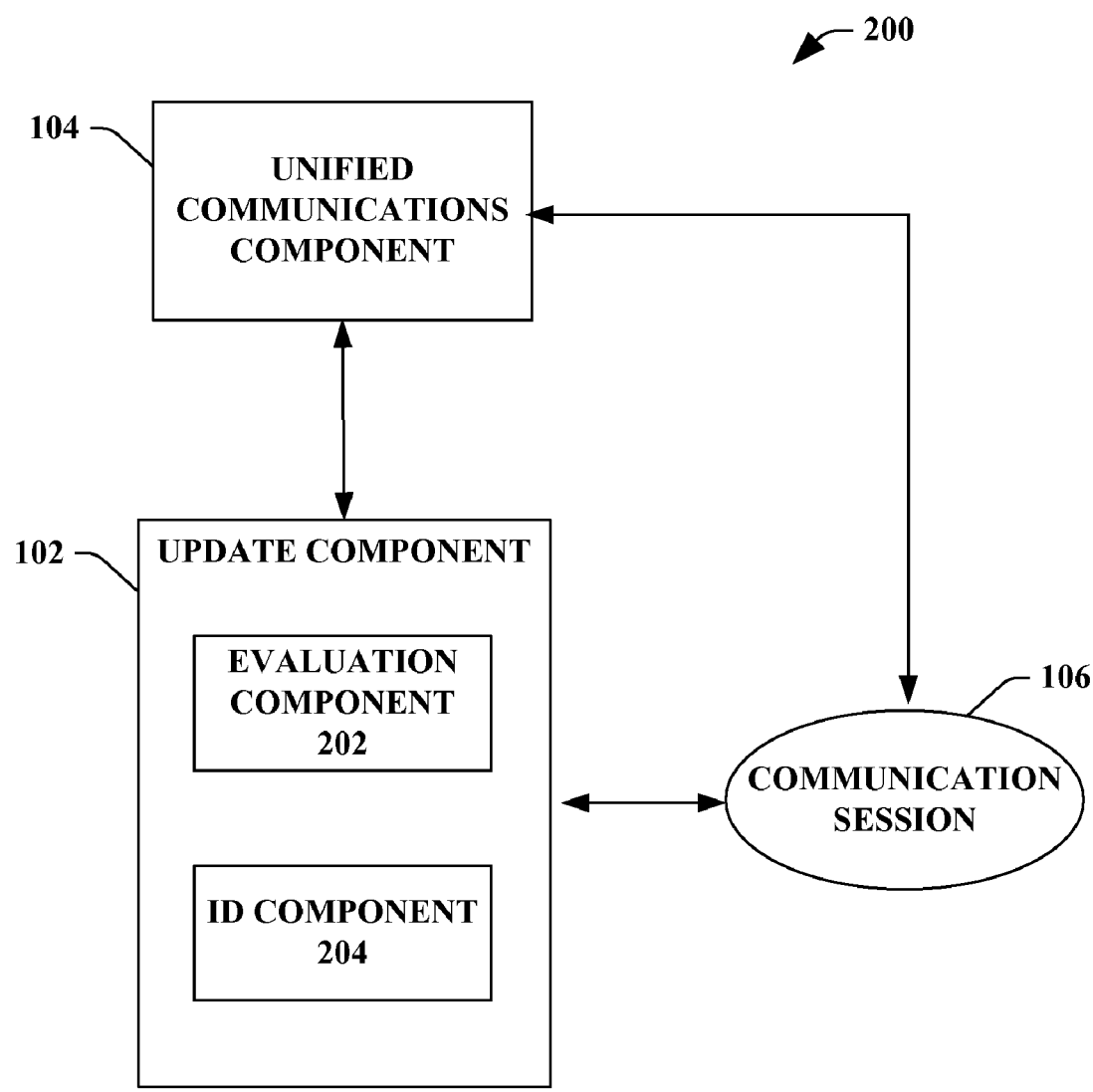
FIG. 2 illustrates a block diagram of an exemplary system that facilitates evaluating real-time communications in order to maintain conversation identification integrity and/or accuracy.

FIG. 2 illustrates a system 200 that facilitates evaluating real-time communications in order to maintain conversation identification integrity and/or accuracy. The system 200 can include the update component 102 that can dynamically update a conversation ID upon the redirection and/or forwarding of an invitation related to at least one of the communication session 106 or a data communication mode. The communication session 106 can be any suitable real-time communication employed by the unified communications component 104, wherein the communication session 106 can include at least one data communication mode (e.g., voice, audio, instant messaging, VoIP, desktop sharing, application sharing/distribution, etc.) initiated by an invitation from a source to a target. In order to accurately track such communication sessions and/or conversations, an additional conversation ID can be associated with the communication session upon a redirection and/or forwarding of an invitation. By updating the conversation ID, the update component 102 allows the participants, data communication modes, time, communication session, etc. to be tracked/stored/logged.

The update component 102 can include an evaluation component 202 that can continuously monitor a communication session 106 and/or invitations associated therewith. In other words, the evaluation component 202 can dynamically evaluate data related to the communication session 106 and any invitations in order to identify whether the invitation is redirected and/or forwarded by a target. It is to be appreciated that the evaluation component 202 can evaluate and/or monitor any suitable data associated with the system 200 in order to identify a redirection and/or forwarding of an invitation. For instance, the evaluation component 202 can evaluate and/or monitor the communication session 106, a target associated with the communication session 106, a server related to the communication session 106, a source associated with the communication session 106, an application and/or software leveraged by the unified communications component 104, a real-time communication related to a source, a real-time communication related to a target, a device/machine (e.g., computer, portable computer, hand-held device, laptop, portable digital assistant (PDA), desktop, mobile communications device, smartphone, VoIP device, instant messaging device, portable media device, media player, gaming device, device with real-time communication capability, etc.) utilized by a source, a device/machine utilized by a target, etc. The update component 102 can further include an ID component 204 that can generate conversation ID's and/or communication session ID's based at least in part upon the detection of an invitation being redirected and/or forwarded. The ID component 204 can generate an additional conversation ID in order to distinguish the communication session 106 upon the forwarding and/or redirecting of an invitation. It is to be appreciated that the ID component 204 can provide an additional conversation ID based upon the evaluation component 202 detecting and/or identifying the forwarding and/or redirection.

For example, a real-time communication session can be initiated upon a target receiving an invitation from a source, wherein the communication session can be employed utilizing VoIP and be distinguished by the conversation ID 1234. An additional data communication mode can be initiated within the communication session by an invitation (e.g., sent by any participant involved with the communication session), wherein the invitation can be forwarded and/or redirected by the intended target. Upon such redirection and/or forwarding, the evaluation component 202 can identify the redirection and enable the ID component 204 to generate an additional conversation ID, for instance, a conversation ID 5678. Thus, the conversation ID 1234 can accurately describe and/or correlate to the communication session prior to the forwarding and/or redirection, whereas the conversation ID 5678 can describe and/or correlate to the communication session with the new participant since the invitation was forwarded and/or redirected.

Figure 3:
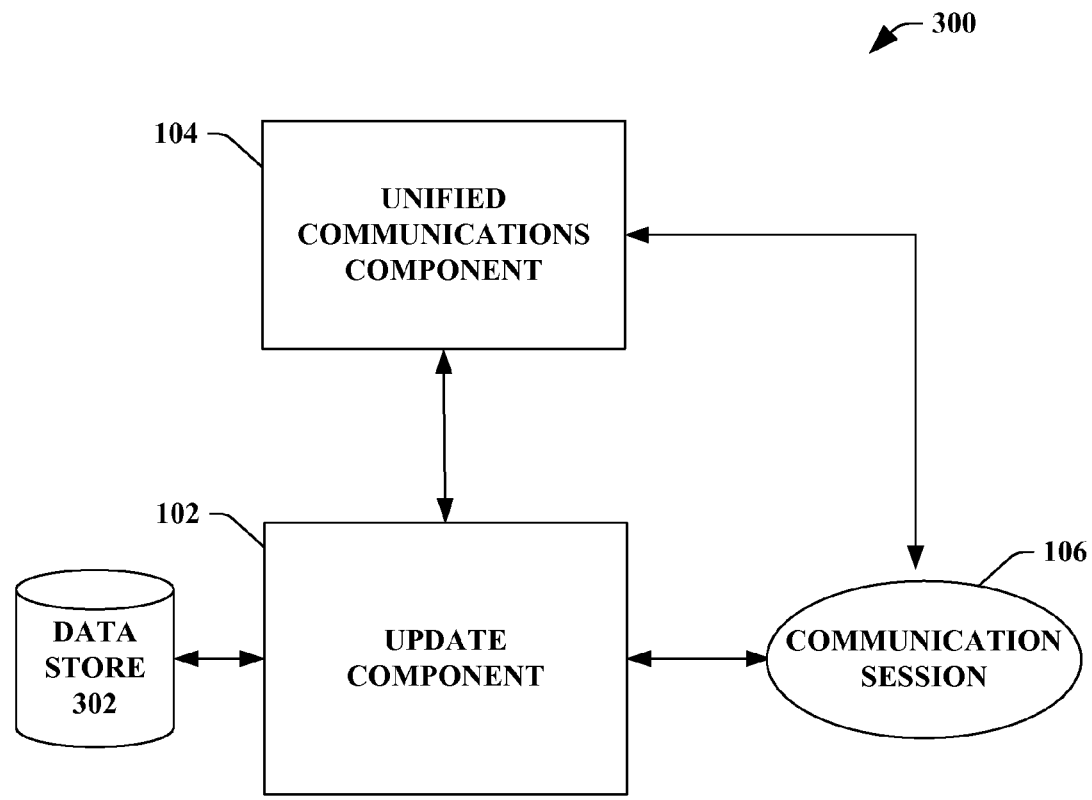
FIG. 3 illustrates a block diagram of an exemplary system that facilitates detecting a redirection of a real-time communication invitation and creating conversation identifications for tracking.

FIG. 3 illustrates a system 300 that facilitates detecting a redirection of a real-time communication invitation and creating conversation identifications for tracking. The system 300 can include the update component 102 that can generate an additional conversation ID for the communication session 106 based upon an invitation being forwarded and/or redirected. The communication session 106 can be a real-time communication employed by the unified communications component 104, wherein an invitation can relate to at least one of the communication session 106 or a data communication mode utilized therewith.

The system 300 can further include a data store 302 that can include any suitable data related to the update component 102, the unified communications component 104, the communication session 106, a data communication mode within the communication session 106, a source, a target, an invitation, and/or any suitable data associated with the system 300. For example, the data store 302 can include, but not limited to including, conversation IDs, communication session IDs, historic data related to communication session IDs, historic data related to conversation IDs, participants within the communication session, data communication modes utilized within a communication session, invitation data, invitation historic data, logging data related to detected forwarding and/or redirection of invitations, communication session ID data (e.g., participants, time, data communication mode, length, duration, Internet protocol address, etc.), conversation ID data, applications and/or software utilized or leveraged within the communication session, etc.

It is to be appreciated that the data store 302 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 302 of the subject systems and methods is intended to comprise, without being limited to, these and any other suitable types of memory. In addition, it is to be appreciated that the data store 302 can be a server, a database, a hard drive, a pen drive, an external hard drive, a portable hard drive, and the like.

Figure 4:
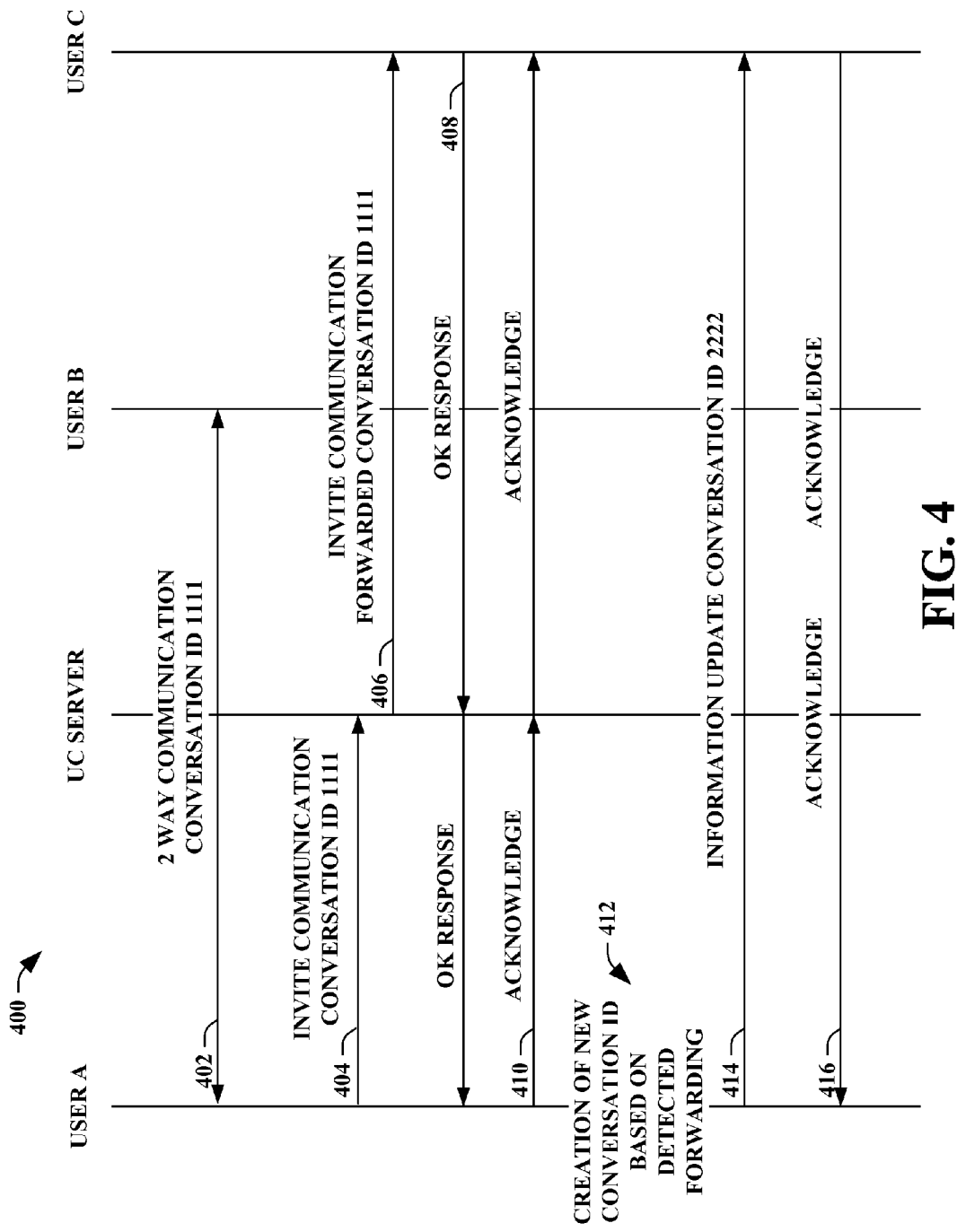
FIG. 4 illustrates a block diagram of an exemplary timing diagram that facilitates creating conversation identification based on redirection and/or forwarding of a real-time communication invitation.

FIG. 4 illustrates a timing diagram 400 that facilitates creating communication session identification and/or conversation identification based on redirection and/or forwarding of a real-time communication invitation. It is to be appreciated that the timing diagram 400 is just one illustration in accordance with the subject innovation and is not to be limiting on the claimed subject matter. The timing diagram 400 can include a user A, a unified communications (UC) server, a user B, and a user C, wherein each user can utilize a unified communications component (not shown but described above) associated with the UC server in order to employ a real-time communication via communication sessions.

At reference numeral 402, a two-way communication (e.g., a communication session and/or conversation with at least one data communication mode) can be utilized between user A and user B. This communication session (e.g., the two-way communication) can include a conversation ID 1111. At reference numeral 404, user A can initiate an additional data communication mode by sending an invitation targeted to user B, wherein the invitation is communicated through the UC server. At reference numeral 406, the invitation is forwarded by user B to user C. It is to be appreciated that the forwarding and/or redirection can be automatic, manual, and/or any combination thereof. At reference numeral 408, user C can respond with acceptance (e.g., ok response), wherein at reference numeral 410, user A can acknowledge such response. Based upon the redirection and/or forwarding, at reference numeral 412, a new conversation ID can be issued to the communication session, such as conversation ID 2222. It is to be appreciated that the new conversation ID can be implemented by at least one of the user A, the device/machine/application associated with user A, the UC server, and/or the unified communications component associated with user A. Without the new conversation ID of 2222, user A may include conversation (e.g., communication session) history items with the same conversation ID, when each communication session should be distinguished based upon changing participants. At reference numeral 414, an information update for the conversation ID can be provided to user C. It is to be appreciated that the update can be provided to user C (e.g., the remote end) with any suitable technique. For instance, SIP informational update can be provided to user C by utilizing XML. At reference numeral 416, user C can provide acknowledgment for the new conversation ID 2222.

Figure 5:
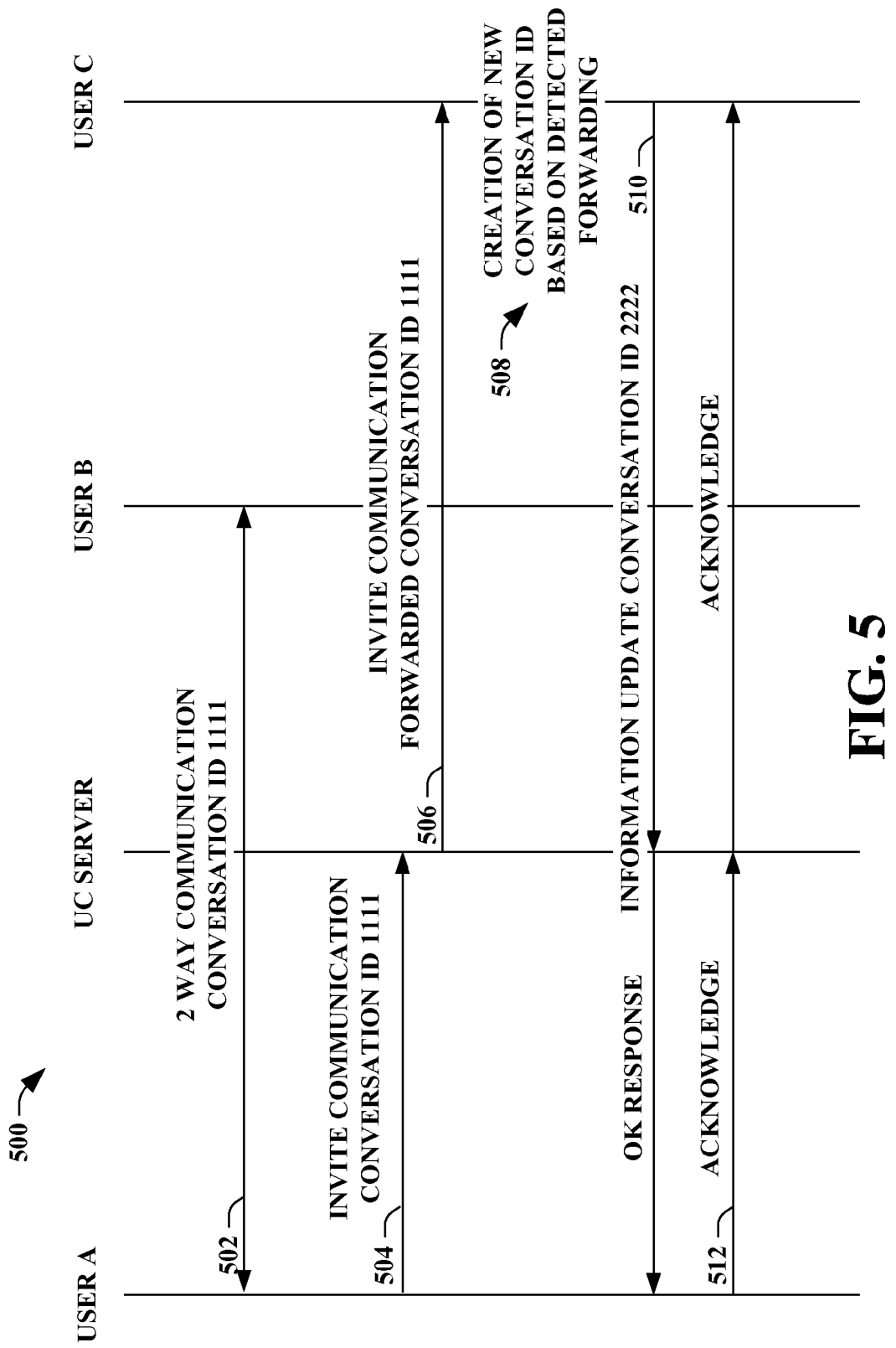
FIG. 5 illustrates a block diagram of exemplary timing diagram that facilitates tracking conversation identifications associated with real-time communications within unified communications.

FIG. 5 illustrates a timing diagram 500 that facilities tracking communication session identifications and/or conversation identifications associated with real-time communications within unified communications. It is to be appreciated that the timing diagram 500 is just one illustration in accordance with the subject innovation and is not to be limiting on the claimed subject matter. The timing diagram 500 can include a user A, a unified communications (UC) server, a user B, and a user C, wherein each user can utilize a unified communications component (not shown but described above) associated with the UC server in order to employ a real-time communication via communication sessions. It is to be appreciated and understood that the timing diagram 500 provides an additional example of when a conversation ID can be updated/changed.

At reference numeral 502, a two-way communication (e.g., a communication session utilizing at least one data communication mode) can be utilized between user A and user B. This communication session (e.g., the two-way communication) can include a conversation ID 1111. At reference numeral 504, user A can initiate an additional data communication mode by sending an invitation targeted to user B, wherein the invitation is communicated through the UC server. At reference numeral 506, the invitation can be forwarded by user B to user C. It is to be appreciated that the forwarding and/or redirection can be automatic, manual, and/or any combination thereof. Based upon the redirection and/or forwarding, at reference numeral 508, a new conversation ID can be issued to the communication session, such as conversation ID 2222. It is to be appreciated that the new conversation ID can be implemented by at least one of the user C, the device/machine/application associated with user C, the UC server, and/or the unified communications component associated with user C. At reference numeral 510, user C can respond with acceptance (e.g., ok response) and the updated conversation ID 2222, wherein at reference numeral 512, user A can acknowledge such response. The update for the conversation ID can be provided to user A (e.g., the remote end) with any suitable technique. For instance, SIP informational update can be provided to user A by utilizing XML. In other words, the receiving application/unified communications component/device/machine can send the new conversation ID in the response (e.g., ok response) when it is determined that the original intended participant (e.g., in this example, user B) was not itself. For example, the determination can be made by evaluating the invitation, such as the TO: line in the SIP invitation (e.g., the TO: line stated user B but it was received by user C).

Figure 6:
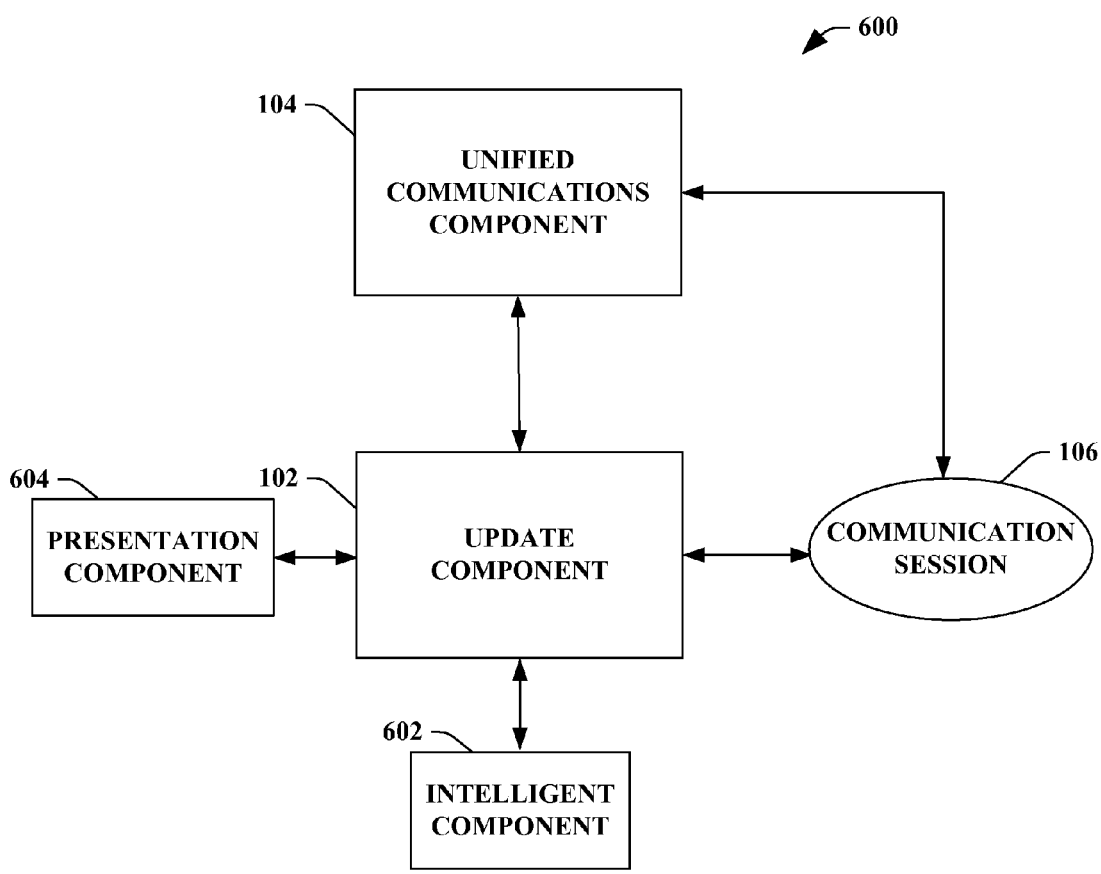
FIG. 6 illustrates a block diagram of an exemplary system that facilitates evaluating real-time communications in order to maintain conversation identification integrity and/or accuracy.

FIG. 6 illustrates a system 600 that employs intelligence to facilitate evaluating real-time communications in order to maintain conversation identification integrity and/or accuracy. The system 600 can include the update component 102, the unified communications component 104, the communication session 106, a data communication mode, and/or an invitation. It is to be appreciated that the update component 102, the unified communications component 104, the communication session 106, the data communication mode, and/or the invitation can be substantially similar to respective components, sessions, modes, and/or invitations described in previous figures. The system 600 further includes an intelligent component 602. The intelligent component 602 can be utilized by the update component 102 to facilitate maintaining communication session identification data and/or conversation identification data for a communication session in real-time communications. For example, the intelligent component 602 can infer communication session IDs, conversation IDs, redirection, forwarding, invitation forwarding, invitation redirecting, data communication mode, participants within a communication session, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The update component 102 can further utilize a presentation component 604 that provides various types of user interfaces to facilitate interaction between a user and any component coupled to the update component 102. As depicted, the presentation component 604 is a separate entity that can be utilized with the update component 102. However, it is to be appreciated that the presentation component 604 and/or similar view components can be incorporated into the update component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the update component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
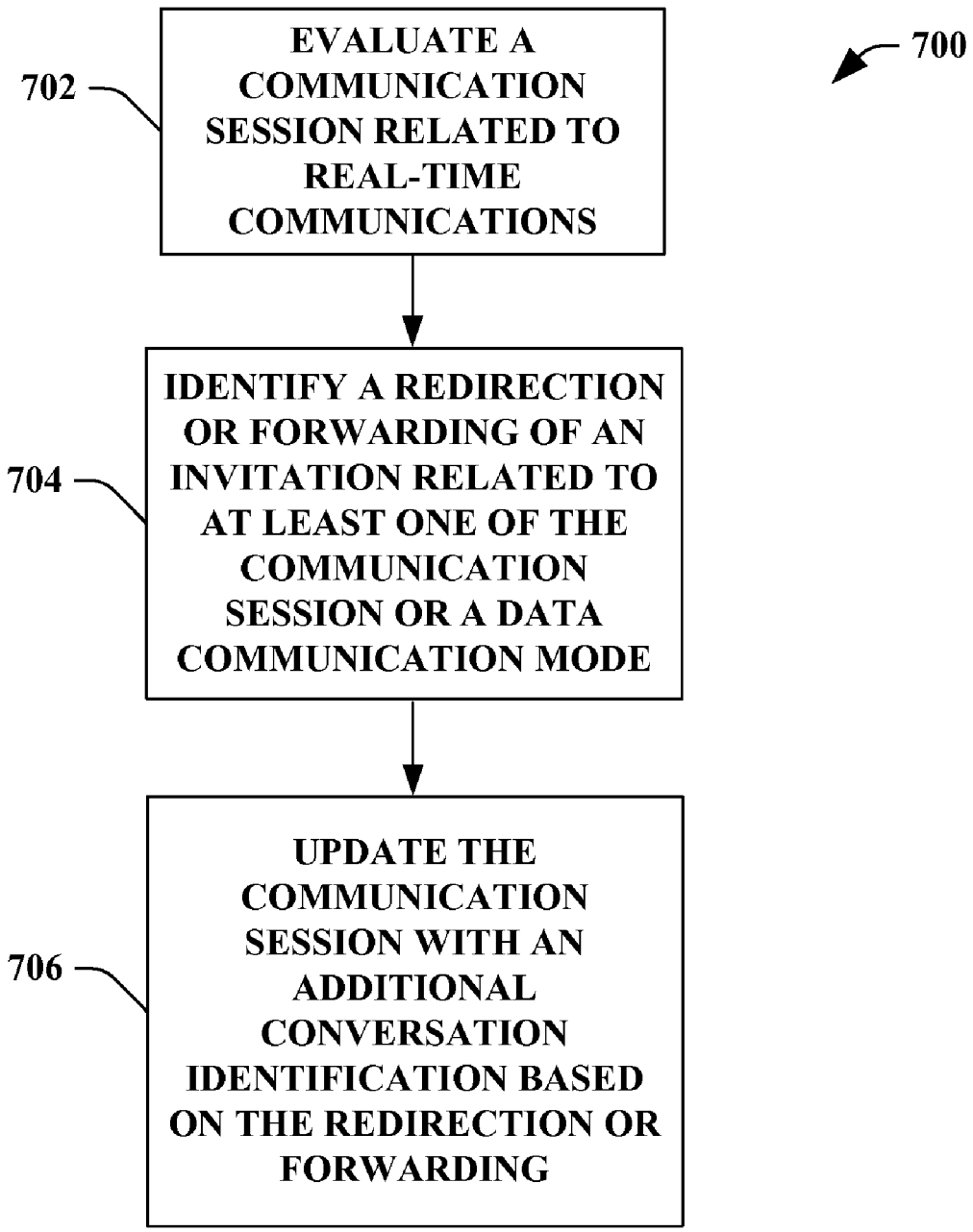
FIG. 7 illustrates an exemplary methodology for generating conversation identifications upon the detection of an invitation being redirected and/or forwarded.
Figure 8:
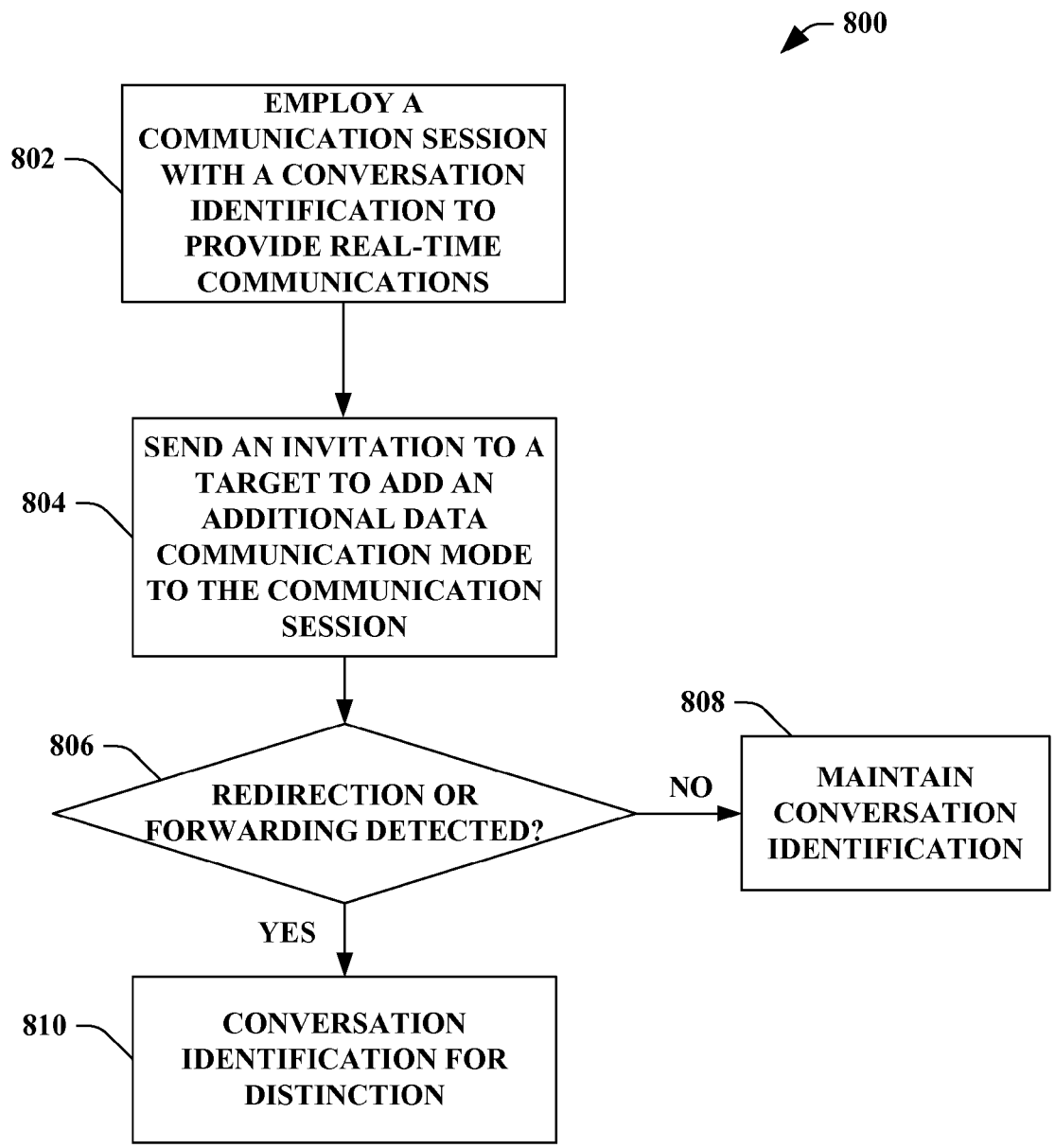
FIG. 8 illustrates an exemplary methodology that facilitates creating conversation identification based on redirection and/or forwarding of a real-time communication invitation.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates generating communication session identifications and/or conversation identifications upon the detection of an invitation being redirected and/or forwarded. At reference numeral 702, a communication session related to real-time communications can be evaluated. The communication session can be implemented by an integrated enterprise communication client in order to enable real-time communications (e.g., communication session) utilizing various data communication modes such as, but not limited to, instant messaging, voice over Internet protocol (VoIP), video conferencing, audio, voice, desktop sharing, application sharing, etc. Furthermore, the communication session can be utilized to integrate various computer applications and/or software such as, but not limited to, a word processing application, a data spreadsheet application, a presentation/slide creation program, an email application (e.g., leveraging off of address books, contact information, etc.), note taking applications, information gathering applications, multi-user collaboration note taking applications, desktop sharing applications, shared workspace applications, proprietary peer-to-peer software applications, and/or enterprise portal applications.

At reference numeral 704, a redirection or a forwarding of an invitation can be identified, wherein the invitation can relate to at least one of the communication session or a data communication mode within the communication session. The redirection or forwarding can be identified by evaluating at least one of a participant within the communication session, a server related to the communication session, the communication session, the invitation, an application and/or software leveraged by the communication session, a device/machine (e.g., computer, portable computer, hand-held, laptop, portable digital assistant (PDA), desktop, mobile communications device, smartphone, VoIP device, instant messaging device, portable media device, media player, gaming device, device with real-time communication capability, etc.) utilized by a participant in the communication session, etc.

At reference numeral 706, the communication session can be updated with an additional conversation identification based at least in part upon the detection of a forwarding and/or redirection. For example, the communication session can include identification data (e.g., communication session identification, conversation identification, communication session ID, conversation ID, etc.) that can be updated upon a forwarding and/or redirecting of an invitation specified for a particular target. If the invitation is forwarded by the target to a disparate entity (e.g., machine, user, computer, etc.), the conversation identification can be updated so as to distinguish the communication session before the forwarding and/or redirection and the communication session after the forwarding and/or redirection.

FIG. 8 illustrates a method 800 for creating communication session identification and/or conversation ID based on redirection and/or forwarding of a real-time communication invitation. At reference numeral 802, a communication session with a conversation ID can be employed to provide real-time communications. It is to be appreciated that the communication session can be associated with real-time communications and/or unified communications implemented by, for instance, an integrated enterprise communications client that interacts with a server. At reference numeral 804, an invitation can be sent to a target to add an additional data communication mode to the communication session. As discussed above, the communication session can include any suitable data communication mode such as, but not limited to, instant messaging, voice over Internet protocol (VoIP), video conferencing, audio, voice, desktop sharing, application sharing, etc.

At reference numeral 806, a determination is made as to whether redirection or forwarding is detected in connection with the invitation. If forwarding or redetection is not identified, the methodology 800 can continue to reference numeral 808. At reference numeral 808, the conversation identification can be maintained (e.g., not change, not updated, etc.). If forwarding or redetection is identified, the methodology 800 can continue to reference numeral 810. At reference numeral 810, the conversation identification can be updated for distinction.

Figure 9:
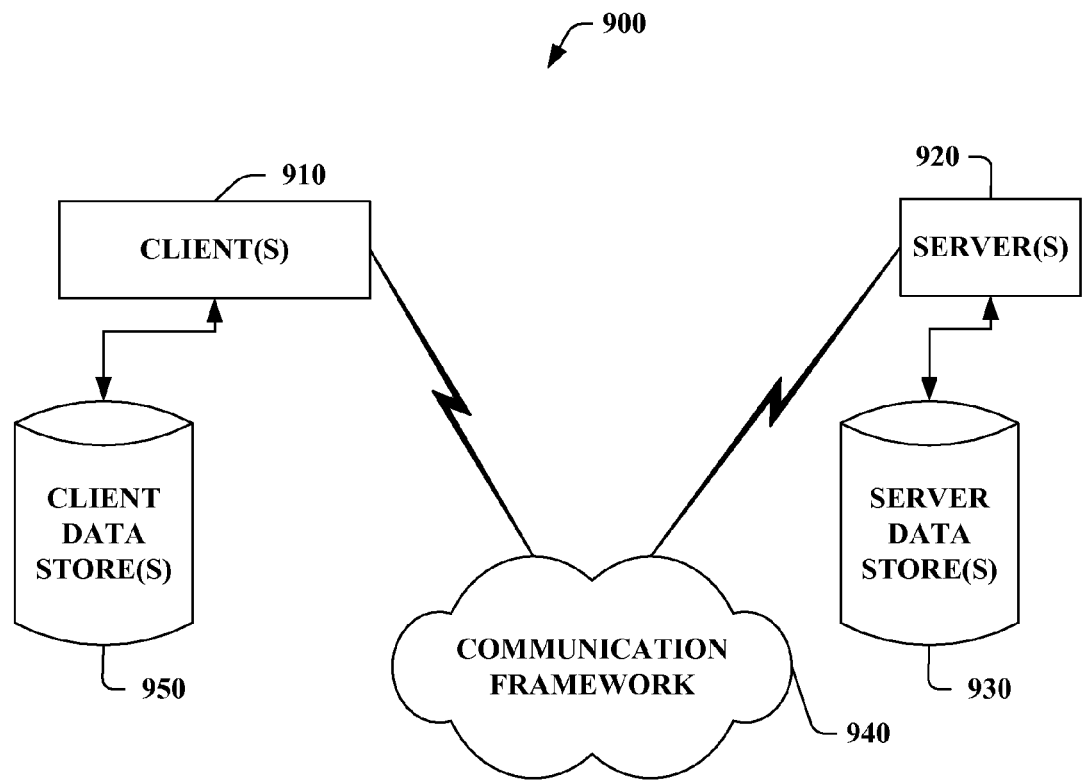
FIG. 9 illustrates an exemplary networking environment, wherein the novel aspects of the claimed subject matter can be employed.
Figure 10:
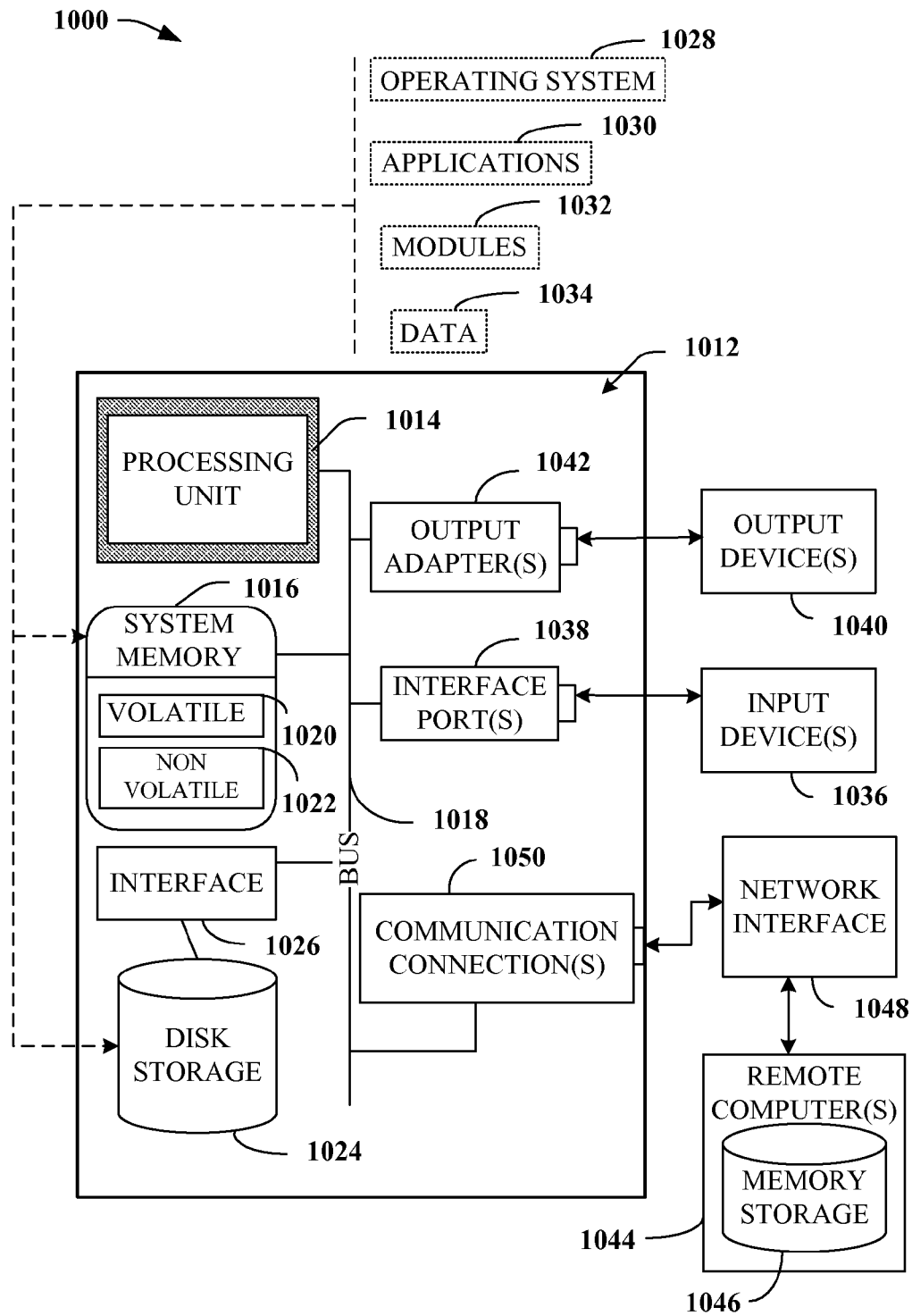
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an update component that facilitates generating communication session identifications and/or conversation identifications including participant information regardless of redirection and/or forwarding within unified communications, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s)

910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system comprising:
   a processor configured to execute computer-executable components; and
   memory storing computer-executable components including:
   a unified communications component configured to initiate a real-time communication session between a source and a target based upon an invitation sent by the source to the target, the real-time communication session including at least one data communication mode, the real-time communication session identified by a conversation identification (ID), the unified communication component further configured to add an additional data communication mode to the real-time communication session upon acceptance of an additional invitation sent by the source to the target;
   an evaluation component configured to monitor invitations associated with the real-time communication session and configured to detect forwarding by the target of the additional invitation sent by the source to the target; and
   an update component configured to maintain the conversation ID for the real-time communication session upon acceptance of the additional invitation sent by the source to the target in response to the evaluation component detecting that the additional invitation sent by the source to the target was not forwarded by the target and configured to generate an additional conversation ID for the real-time communication session upon acceptance of the additional invitation sent by the source to the target in response to the evaluation component detecting that the additional invitation sent by the source to the target was forwarded by the target,
   wherein the unified communications component is further configured to identify the real-time communication session with the additional conversation ID and to continue the real-time communication session in both the at least one data communication mode and the additional data communication mode upon acceptance of the additional invitation sent by the source to the target in response to the evaluation component detecting that the invitation sent by the source to the target was forwarded by the target.

2. The system of claim 1, wherein the additional data communication mode includes at least one of: instant messaging, voice over Internet protocol (VoIP) communication, video conferencing, audio communication, voice communication, desktop sharing, or application sharing.

3. The system of claim 1, wherein the unified communications component includes an integrated enterprise communication client configured to provide real-time communications utilizing unified communications.

4. The system of claim 1, wherein:
   the additional invitation invites the target to add audio communication to instant messaging,
   the unified communications component escalates the real-time communication session to include both instant messaging and audio communication upon acceptance of the additional invitation, and
   the unified communications component identifies the real-time communication session with the additional conversation ID in response to the evaluation component detecting that the additional invitation was forwarded by the target.

5. The system of claim 1, wherein the memory further stores an intelligent component configured to infer at least one of: a communication session ID, a conversation ID, redirection, forwarding, invitation forwarding, invitation redirecting, data communication mode or participants within a real-time communication session, based at least in part on a computation of a probability distribution over states of interest based on a consideration of data and events.

6. The system of claim 1, wherein:
the unified communications component is further configured to integrate an application into the real-time communication session, and
the application includes at least one of: a word processing application, a data spreadsheet application, a presentation/slide creation program, an email application, a note taking application, an information gathering application, a multi-user collaboration note taking application, a desktop sharing application, a shared workspace application, a proprietary peer-to-peer software application, or an enterprise portal application.

7. The system of claim 6, wherein the unified communications component is further configured to utilize the application for a portion of data related to contact information.

8. The system of claim 1, wherein:
the at least one data communication mode is configured to be implemented within a first window, and
the additional data communication mode is configured to be implemented within a second window.

9. The system of claim 1, wherein the evaluation component is further configured to monitor data communication modes within the real-time communication session.

10. The system of claim 1, wherein the evaluation component is configured to monitor at least one of: the real-time communication session, the target associated with the real-time communication session, a server related to the real-time communication session, the source associated with the real-time communication session, an application used by the unified communications component, a real-time communication related to the source, a real-time communication related to the target, a device utilized by the source, or a device utilized by the target.

11. The system of claim 10, wherein at least one of the device utilized by the source and the device utilized by the target includes at least one of: a machine, a computer, a portable computer, a hand-held device, a laptop, a portable digital assistant (PDA), a desktop, a mobile communications device, a smartphone, a VoIP device, an instant messaging device, a portable media device, a media player, a gaming device, or a device with real-time communication capability.

12. The system of claim 1, wherein the additional conversation ID reflects the source, the target, the at least one data communication mode, the additional data communication mode, and at least one additional participant in the real-time communication session.

13. The system of claim 12, wherein the additional conversation ID correlates to the real-time communication session during a time following the forwarding by the target of the additional invitation and the acceptance of the additional invitation by the at least one additional participant.

14. The system of claim 1, wherein the update component generates the additional conversation ID in response to the real-time communication session escalating to a conference call.

15. The system of claim 14, wherein the evaluation component is configured to identify the escalating based upon an evaluation of at least one of: invitations associated with at least one of the real-time communication session or a data communication mode, a participant included within the real-time communication session, a participant designation of a conference call, a participant ranking within a corporate hierarchy, a conference call request, a conference call response, a conference call flag/identifier, or a manual designation of a conference call.

16. A computer-implemented method, comprising:
initiating a real time communication session between a source and a target based upon an invitation sent by the source to the target, the real-time communication session including at least one data communication mode;
identifying the real-time communication session by a conversation identification (ID);
monitoring invitations associated with the real-time communication session;
adding an additional data communication mode to the real-time communication session upon acceptance of an additional invitation sent by the source to the target;
detecting whether forwarding by the target of the additional invitation sent by the source to the target has occurred;
maintaining the conversation ID for the real-time communication session including the additional data communication mode upon acceptance of the additional invitation sent by the source to the target in response to detecting that the additional invitation sent by the source to the target was not forwarded by the target; and
in response to detecting that the additional invitation sent by the source to the target was forwarded by the target:
generating an additional conversation ID associated with the real-time communication session including the additional data communication mode upon the acceptance of the additional invitation sent by the source to the target,
identifying the real-time communication session including the additional data communication mode with the additional conversation ID, and
continuing the real-time communication session in both the at least one data communication mode and the additional data communication mode.

17. The method of claim 16, further comprising:
generating the additional conversation ID for the real-time communication session in response to escalation of the real-time communication session to a conference call.

18. The method of claim 16, further comprising:
implementing the additional data communication mode with at least one of instant messaging, voice over Internet protocol (VoIP) communication, video conferencing, audio communication, voice communication, desktop sharing, or application sharing.

19. The method of claim 16, further comprising:
determining that the additional invitation was received by an additional participant; and
identifying the source, the target, the at least one communication mode, the additional data communication mode, and the additional participant in the additional conversation ID for the real-time communication session.

20. A computer-readable storage device medium storing instructions that, when executed by a computing device, cause the computing device to perform operations comprising:
initiating a real-time communication session between a source and a target based upon an invitation sent by the source to the target, the real-time communication session including at least one data communication mode;
identifying the real-time communication session by a conversation identification (ID);
monitoring invitations associated with the real-time communication session;
adding an additional data communication mode to the real-time communication session upon acceptance of an additional invitation sent by the source to the target;

detecting whether forwarding by the target of the additional invitation sent by the source to the target has occurred;

maintaining the conversation ID for the real-time communication session including the additional data communication mode upon acceptance of the additional invitation sent by the source to the target in response to detecting that the additional invitation sent by the source to the target was not forwarded by the target; and in response to detecting that the additional invitation sent by the source to the target was forwarded by the target:
generating an additional conversation ID associated with the real-time communication session including the additional data communication mode upon the acceptance of the additional invitation sent by the source to the target, identifying the real-time communication session including the additional data communication mode with the additional conversation ID, and continuing the real-time communication session in both the at least one data communication mode and the additional data communication mode.

* * * * *